US009294864B2

(12) United States Patent
Chen et al.

(10) Patent No.: US 9,294,864 B2
(45) Date of Patent: Mar. 22, 2016

(54) METHODS AND SYSTEMS FOR DETECTING AND PREVENTING UNINTENDED DIALING BY A PHONE DEVICE

(71) Applicant: Verizon Patent and Licensing Inc., Arlington, VA (US)

(72) Inventors: Ming Chen, Bedford, MA (US); Lei Zhang, Frisco, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 316 days.

(21) Appl. No.: 13/664,392

(22) Filed: Oct. 30, 2012

(65) Prior Publication Data

US 2014/0120891 A1 May 1, 2014

(51) Int. Cl.
*G06F 3/0487* (2013.01)
*G06F 3/0488* (2013.01)
*G06F 21/31* (2013.01)
*H04W 4/00* (2009.01)
*H04W 4/02* (2009.01)

(52) U.S. Cl.
CPC .............. *H04W 4/001* (2013.01); *G06F 3/0487* (2013.01); *G06F 3/0488* (2013.01); *G06F 21/316* (2013.01); *H04W 4/027* (2013.01)

(58) Field of Classification Search
CPC ...... H04W 4/00; H04W 4/001; G06F 3/0487; G06F 3/0488
USPC ..................... 455/565, 418, 411, 412.2, 422.1
See application file for complete search history.

(56) References Cited

U.S. PATENT DOCUMENTS

| 8,543,397 | B1 * | 9/2013 | Nguyen ..................... 704/235 |
| 2012/0164978 | A1 * | 6/2012 | Conti .................. G06F 21/32 455/411 |
| 2012/0284297 | A1 * | 11/2012 | Aguera-Arcas et al. ...... 707/769 |
| 2013/0120278 | A1 * | 5/2013 | Cantrell .................... 345/173 |
| 2014/0109024 | A1 * | 4/2014 | Miyazaki ............ G06F 3/04883 715/863 |

OTHER PUBLICATIONS

Wikipedia, Pocket Dialing, 2 pages, http://en.wikipedia.org/wiki/Pocket_dialing, as accessed on Oct. 29, 2012.
7 BIT, Call Confirm, 2 pages, https://play.google.com/store/apps/details?id=net.nanabit.callconfirm&hl=en, as accessed on Oct. 29, 2012.

* cited by examiner

*Primary Examiner* — Asghar Bilgrami

(57) ABSTRACT

An exemplary method includes an unintended-dialing detection and prevention system 1) determining, based on an unintended-dialing detection heuristic, a phone dialing pattern associated with a phone dialing event of a phone device, 2) determining, based on the unintended-dialing detection heuristic, that the phone dialing pattern associated with the phone dialing event matches a predefined phone dialing pattern indicative of unintended dialing, and 3) automatically performing, in response to the determining that the phone dialing pattern associated with the phone dialing event matches the predefined phone dialing pattern indicative of the unintended dialing, an operation configured to prevent a placement of a phone call by the phone device in response to the phone dialing event. Corresponding methods and systems are also disclosed.

16 Claims, 13 Drawing Sheets

Unintended-Dialing Detection Heuristic
300

Pattern Generation Heuristic
302

- Ambient Light
- Orientation
- Motion
- Proximity

Match Determination Heuristic
304

- Ambient Light
- Orientation
- Motion
- Proximity

Fig. 3

METHODS AND SYSTEMS FOR DETECTING AND PREVENTING UNINTENDED DIALING BY A PHONE DEVICE

BACKGROUND INFORMATION

When a phone device such as a mobile phone is in a person's handbag or pocket, input may be accidentally provided to the phone device. The accidental input may initiate an unintended placement of a phone call by the phone device. Such unintended placement of a phone call, which is commonly referred to as "pocket dialing" or "pocket calling," may inconvenience and/or annoy a recipient of the phone call. Moreover, the user of the phone device that placed the unintended phone call may be inconvenienced or embarrassed by the phone call. Sometimes, the recipient of the phone call may overhear whatever is happening in the vicinity of the user, which may compromise the privacy of the user.

Mobile phones have been equipped with features that help prevent pocket dialing. For example, many mobile phones provide a phone lock feature. A user of a mobile phone having a phone lock feature may manually lock the mobile phone. While locked, the keyboard or touch screen of the mobile phone will not respond to dialing input. The user must first manually unlock the mobile phone before dialing to place a phone call. Unfortunately, a user may not always remember to lock the mobile phone before placing the mobile phone in a pocket, handbag, or other position that is susceptible to unintended dialing.

As another example, certain mobile phones have been equipped with a call confirmation feature. Each time a user of a mobile phone equipped with a call confirmation feature dials to place a phone call, the mobile phone will prompt the user to provide additional input to manually confirm that the dialing is intended. This extra confirmation step may be inconvenient or annoying to some users and may introduce unnecessary delay to the dialing and placement of intended phone calls.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 illustrates an exemplary unintended-dialing detection heuristic according to principles described herein.

DETAILED DESCRIPTION OF PREFERRED EMBODIMENTS

Figure 1:
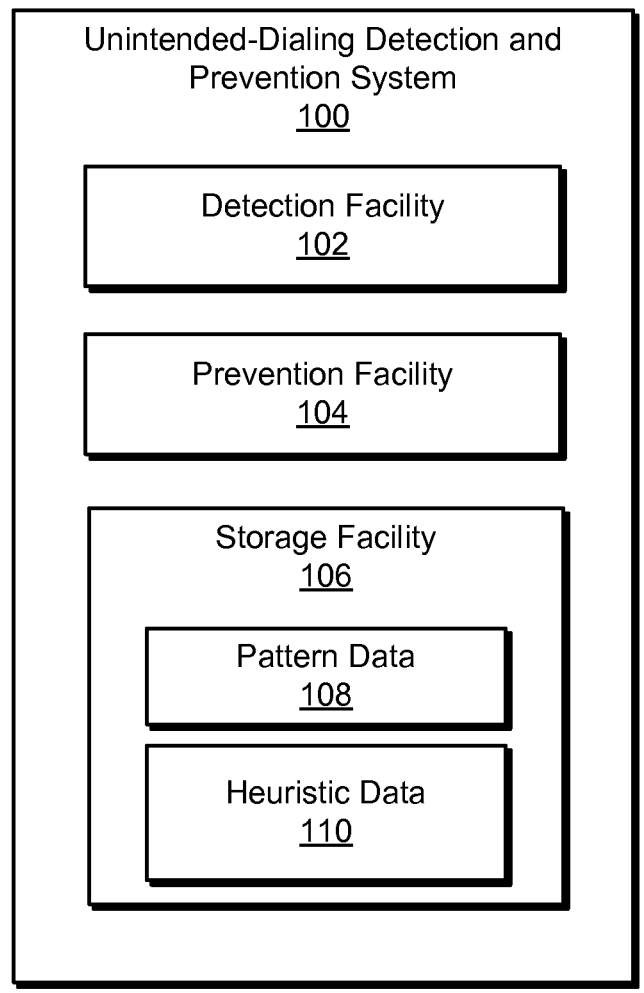
FIG. 1 illustrates an exemplary unintended-dialing detection and prevention system according to principles described herein.

Exemplary methods and systems for detecting and preventing unintended dialing by a phone device are described herein. The exemplary methods and systems described herein may automatically detect and/or prevent unintended dialing, such as by detecting an unintended phone dialing event and preventing placement of a phone call in response to the unintended phone dialing event. This may be accomplished without human intervention and/or without requiring a user of a phone device to manually provide input to confirm every intended dialing.

As an example, an unintended-dialing detection and prevention system may be configured to determine, based on an intended-dialing detection heuristic, a phone dialing pattern associated with a phone dialing event of a phone device and whether the phone dialing pattern matches a predefined phone dialing pattern indicative of unintended dialing. When a match to a predefined phone dialing pattern indicative of unintended dialing is determined to exist, the system may automatically perform an operation configured to prevent placement of a phone call by the phone device in response to the phone dialing event.

The exemplary methods and systems described herein may tailor the detection of unintended dialing to a phone device and/or a user of the phone device based on historical phone dialing behavior associated with the phone device. The tailoring may increase the accuracy and/or reliability with which the methods and systems detect unintended dialing for the phone device and/or the user of the phone device.

As an example, an unintended-dialing detection and prevention system may be configured to maintain, for use in detecting unintended dialing on a phone device, data representative of a set of predefined phone dialing patterns and an unintended-dialing detection heuristic, monitor, over time, phone dialing behavior associated with the phone device, and automatically tailor, based on a configuration heuristic and the phone dialing behavior associated with the phone device, at least one of the set of predefined phone dialing patterns and the unintended-dialing detection heuristic to the monitored phone dialing behavior associated with the phone device.

As used herein, the term "unintended dialing" may refer to a phone device receiving unintentionally-provided input (e.g., button actuations, touch screen touches, and/or speech commands not intentionally provided by a user of the phone device) that may initiate or otherwise trigger or contribute to an attempt by the phone device to place a phone call. Additionally or alternatively, "unintended dialing" may refer to the phone device performing one or more operations to attempt to place or initiate placement of a phone call in response to receipt of unintentionally-provided input.

In contrast, the term "intended dialing" may refer to a phone device receiving intentionally-provided input (e.g., button actuations, touch screen touches, and/or speech commands intentionally provided by a user of the phone device) that may initiate or otherwise trigger or contribute to an attempt by the phone device to place a phone call. Additionally or alternatively, "intended dialing" may refer to the phone device performing one or more operations to attempt to place or initiate placement of a phone call in response to receipt of intentionally-provided input.

As used herein, the term "phone dialing event" or "dialing event" may refer to a phone device receiving any set of intentionally-provided or unintentionally-provided input and/or performing any specific set of operations to attempt to place a phone call in response to receipt of provided input. For example, a "phone dialing event" may include the phone device receiving, from a user of the phone device, intentionally-provided input indicating a phone number to be called. The user may intentionally provide the input in any suitable way, such as by using a keypad or other input mechanism to enter or select the phone number. Additionally or alternatively, a "phone dialing event" may include the phone device receiving unintentionally-provided input indicating a phone number to be called. The unintentionally-provided input may be unintentionally provided to the phone device in any way not intended by the user of the phone device, such as may happen when the phone device is in a handbag or pocket of the user.

As used herein, the term "phone dialing pattern" may refer to a set of one or more physical attributes associated with a phone device and a phone dialing event of the phone device. Examples of such physical attributes may include, without limitation, ambient light proximate the phone device (e.g., general illumination in the environment of the phone device), an orientation of the phone device (e.g., portrait, landscape, upright, upside-down, tilt angle, etc.), a motion of the phone device (e.g., acceleration, rotation, etc.), and a presence of one or more physical objects proximate the phone device (e.g., proximity of the phone device to an object such as a user's face or pocket).

The set of physical attributes may be associated with a phone dialing event of the phone device in any suitable way, such as by temporal proximity to the phone dialing event. For example, a phone dialing pattern may include values of physical attributes associated with the phone device at a time or during a time period associated with a phone dialing event of the phone device. To illustrate, a phone dialing pattern may include values representing the ambient light proximate the phone device during the phone dialing event, the orientation of the phone device during the phone dialing event, motion of the phone device during the phone dialing event, and/or the presence or lack of presence of one or more physical objects physically proximate the phone device during the phone dialing event. Additionally or alternatively, the phone dialing pattern may include values representing any of these physical attributes associated with the phone device temporally before and/or after the phone dialing event (e.g., a predetermined time period immediately preceding the event and/or a predetermined time period immediately following the event).

Exemplary systems, methods, and devices associated with detecting and preventing unintended dialing by a phone device will now be described in reference to the drawings.

FIG. 1 illustrates an exemplary unintended-dialing detection and prevention system 100 ("system 100"). As shown, system 100 may include, without limitation, a detection facility 102, a prevention facility 104, and a storage facility 106 selectively and communicatively coupled to one another. Any suitable communication technologies may be employed to facilitate communications between facilities 102-106. Each of these facilities will now be described in more detail.

Detection facility 102 may be configured to detect a phone dialing event of a phone device. The detection may be made in any suitable way. For example, detection facility 102 may be configured to interface with one or more components of the phone device to detect the phone dialing event, such as by monitoring input received by the phone device (e.g., input that provides and/or selects a phone number to be called) and/or by gathering and using device status data to detect a request of the phone device to initiate placement of a phone call and/or to detect the phone device attempting to place or initiating an attempt to place a phone call.

Detection facility 102 may be configured to determine a phone dialing pattern associated with a phone dialing event of a phone device. The determination may be made in any suitable way and may be performed in response to a detection of a phone dialing event of the phone device.

Figure 2:
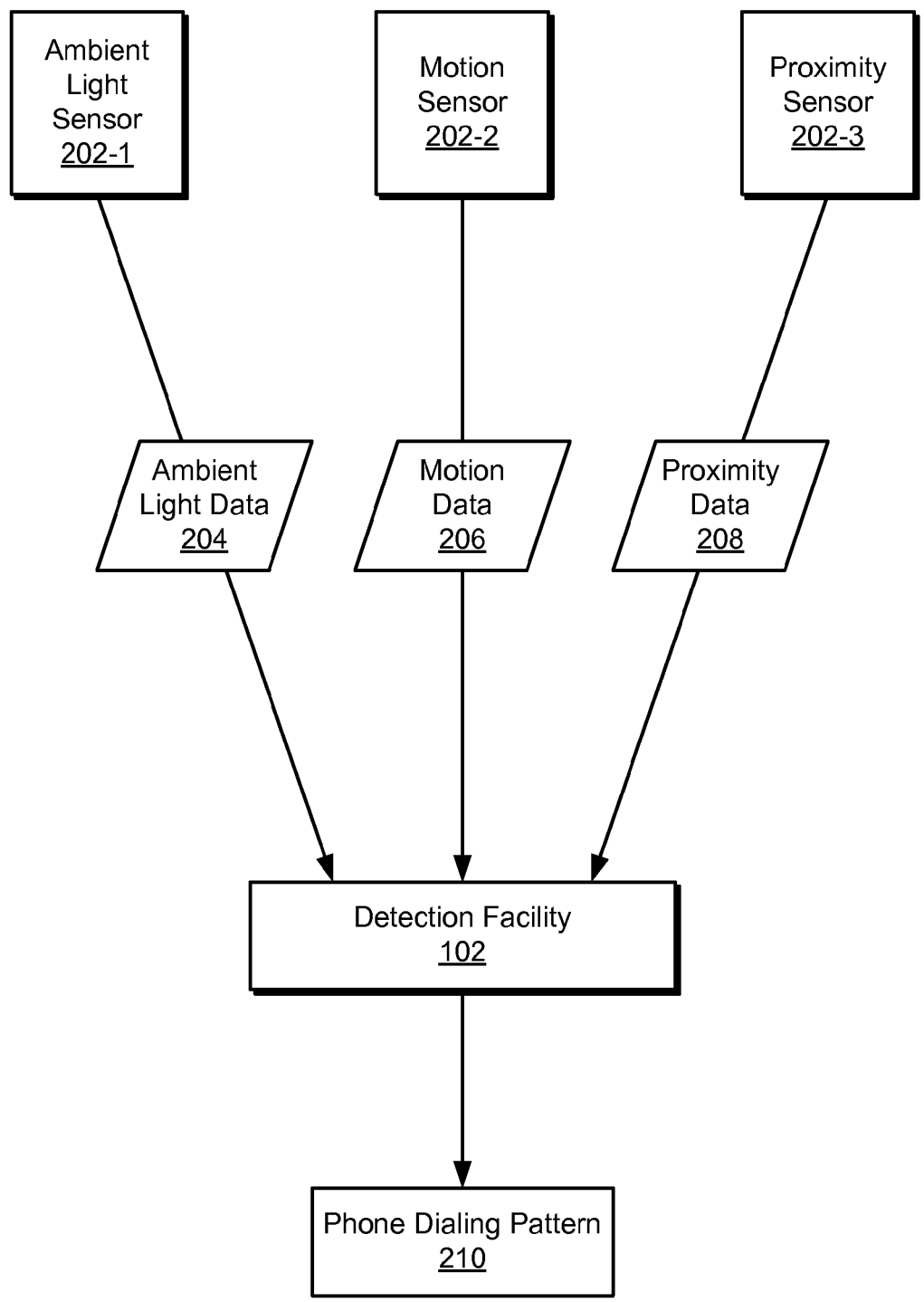
FIG. 2 illustrates an exemplary gathering of data from a set of sensors that may be included in a phone device according to principles described herein.

In certain examples, detection facility 102 may determine a phone dialing pattern by obtaining and using data representative of one or more physical attributes of the phone device to generate a set of data representative of the phone dialing pattern. For example, the phone device may include components configured to gather data that may be indicative of physical attributes associated with the phone device. To illustrate, FIG. 2 shows a set of sensors 202 (e.g., sensors 202-1 through 202-3) that may be included in the phone device and configured to gather data that may be indicative of physical attributes associated with the phone device.

Sensor 202-1 may include a set of one or more ambient light sensors configured to sense ambient light proximate the phone device. Sensor 202-1 may employ any suitable ambient light sensing technologies, including such technologies that may be used by the phone device to control power consumption (e.g., by controlling display and/or keypad backlight brightness depending on ambient light conditions). Sensor 202-1 may provide ambient light data 204 representative one or more properties of ambient light proximate the phone device.

Sensor 202-2 may include a set of one or more motion sensors, such as one or more accelerometers, configured to sense motion of the phone device. Sensor 202-2 may employ any suitable motion sensing technologies, including such technologies that may be used by the phone device to determine the orientation of the phone device. Sensor 202-2 may provide motion data 206 representative one or more motion and/or orientation properties of the phone device.

Sensor 202-3 may include a set of one or more proximity sensors configured to sense physical objects proximate the phone device. Sensor 202-3 may employ any suitable proximity sensing technologies, including such technologies that may be used by the phone device to determine how close a display screen of the phone device is to a user's body and/or when the phone device has been placed next to a user's ear, at which point the phone device may turn off the display to conserve power and/or may stop detecting touch input to avoid unwanted input. Sensor 202-3 may provide proximity data 208 representative one or more proximity properties of one or more physical objects proximate the phone device.

As shown in FIG. 2, detection facility 102 may obtain ambient light data 204, motion data 206, and proximity data 208 from sensors 202-1, 202-2, and 202-3, respectively. The sensor data may include raw sensor data and/or processed sensor data, such as sensor data that has been processed by an operating system running on the phone device, which processing may include determining, from raw sensor data, specific ambient light, orientation, motion, and/or proximity attributes and/or attribute values associated with the phone device.

Detection facility 102 may use the gathered data to determine a phone dialing pattern 210 of the phone device. For example, from the gathered data, detection facility 102 may generate phone dialing pattern 210 to include a set of data that represents values for a set of one or more physical attributes associated with the phone device, such as a set of data that represents values of ambient light proximate the phone device, orientation of the phone device, motion of the phone device, and/or proximity of physical objects to the phone device.

As mentioned, the set of physical attributes represented by the phone dialing pattern 210 may be temporally proximate to a phone dialing event of the phone device. Thus, the phone dialing pattern may represent one or more physical attributes associated with the phone device as the physical attributes existed before, during, and/or after a phone dialing event of the phone device. For example, the phone dialing pattern may represent values of ambient light proximate the phone device, orientation of the phone device, motion of the phone device, and/or proximity of physical objects to the phone device before, during, and/or after the phone dialing event of the phone device (e.g., within a time period that includes a time at which the phone dialing event occurred).

Detection facility 102 may be configured to use the determined phone dialing pattern to determine whether a phone dialing event associated with the phone dialing pattern is intended or unintended, such as by determining whether the phone dialing pattern is indicative of an intended or unintended phone dialing event. To illustrate, in certain examples, detection facility 102 may determine whether a phone dialing pattern associated with a phone dialing event of a phone device matches a predefined phone dialing pattern indicative of unintended dialing. If detection facility 102 determines that a match to a predefined phone dialing pattern exists, the phone dialing pattern may be said to be indicative of unintended dialing.

To this end, as shown in FIG. 1, storage facility 106 may store pattern data 108, which may be representative of a set of one or more predefined phone dialing patterns indicative of unintended dialing. For example, storage facility 106 may include a pattern database containing pattern data 108 representative of predefined phone dialing patterns indicative of unintended dialing.

In certain examples, each predefined phone dialing pattern in the pattern database may be indicative of unintended dialing. For example, a predefined phone dialing pattern may specify a set of physical attributes associated with a phone device that are indicative of unintended dialing.

To illustrate, an exemplary predefined phone dialing pattern may specify physical attribute values such as a low ambient light level, a random or upside-down orientation of the phone device, random motion of the phone device, and/or physical objects surrounding the phone device before, during, and/or after a phone dialing event. These ambient light, orientation, motion, and proximity attribute values may indicate that the phone device is in a pocket, handbag, or other environment not usually associated with intended dialing. For example, the phone device may be oriented upside-down in a user's pocket when the phone dialing event occurs. After the phone dialing event occurs, the phone device may remain oriented upside-down in the user's pocket.

These physical attribute values associated with the phone device are distinctly different from physical attribute values that are indicative of an intended phone dialing event. For example, a typical intended phone dialing event may occur when a phone device is oriented upright, slightly tilted, held in a user's hand, and located within an environment that has an ambient light level conducive to user dialing (e.g., that allows human eyes to recognize the phone keypad or touch screen). After the phone dialing event occurs, the phone device may be moved near the user's ear, or a speaker or headset of the phone device may be turned on.

The above examples of certain phone dialing patterns indicative of unintended and intended dialing are illustrative only. Additional or alternative phone dialing patterns may be represented in pattern data 108 as predefined phone dialing patterns indicative of unintended and/or intended dialing.

After detection facility 102 determines a phone dialing pattern associated with a phone dialing event of a phone device as described above, detection facility 102 may determine whether the phone dialing pattern matches a predefined phone dialing pattern indicative of unintended dialing. In certain examples, detection facility 102 may query a pattern database for a match to the determined phone dialing pattern. If one of the predefined phone dialing patterns included in the pattern database is determined to match the determined phone dialing pattern, detection facility 102 may identify the determined phone dialing pattern associated with the phone dialing event as indicative of unintended dialing and label the phone dialing event as unintended.

Detection facility 102 may be configured to determine a phone dialing pattern and whether the phone dialing pattern matches a predefined phone dialing pattern based on an unintended-dialing detection heuristic ("detection heuristic"). To this end, as shown in FIG. 1, storage facility 106 may store heuristic data 110, which may be representative of the detection heuristic configured for access and use by detection facility 102 to determine a phone dialing pattern and whether the phone dialing pattern matches a predefined phone dialing pattern.

The detection heuristic may specify one or more criteria to be used by detection facility 102 to determine a phone dialing pattern associated with a phone dialing event of a phone device. For example, the detection heuristic may specify a set of physical attributes associated with a phone device that are to be included in a phone dialing pattern generated by detection facility 102. To illustrate, in some examples, the detection heuristic may specify that a phone dialing pattern is to include information about (e.g., values for) the ambient light, orientation, motion, and object proximity associated with a phone device. Accordingly, detection facility 102 will include information about these physical attributes in a phone dialing pattern generated by detection facility 102. In other examples, the detection heuristic may specify that a phone dialing pattern is to include information about the ambient light, orientation, and motion but not the object proximity associated with a phone device. Accordingly, detection facility 102 will include information about only these physical attributes in a phone dialing pattern generated by detection facility 102, and omit information about object proximity. The detection heuristic may also specify data formats, physical attribute value formats, and/or any other criteria to be used by detection facility 102 to determine a phone dialing pattern associated with a phone dialing event of a phone device.

As an example, FIG. 3 illustrates an exemplary detection heuristic 300 that includes a pattern generation heuristic 302 that specifies a set of physical attributes to be used to generate a phone dialing pattern associated with a phone dialing event. Pattern generation heuristic 302 may further specify how values for the specified physical attributes are to be gathered, formatted, and/or used to generate the phone dialing pattern, including in any of the ways described herein.

Additionally or alternatively, the detection heuristic (e.g., detection heuristic 300) may specify one or more criteria to be used by detection facility 102 to determine whether a phone dialing pattern determined by detection facility 102 and associated with a phone dialing event matches a predefined phone dialing pattern included in a pattern database. For example, the detection heuristic may specify a set of physical attributes that are to be compared across phone dialing patterns to determine whether a pattern match exists. To illustrate, in some examples, the detection heuristic may specify that values representing the ambient light, orientation, motion, and object proximity associated with a phone device are to be compared across phone dialing patterns to determine whether a match exists. Accordingly, detection facility 102 will compare ambient light, orientation, motion, and object proximity values specified by the determined phone dialing pattern to predefined ambient light, orientation, motion, and object proximity values specified by a predefined phone dialing pattern, respectively, and, based on the comparisons, determine whether the determined phone dialing pattern matches the predefined phone dialing pattern.

To illustrate, a predefined phone dialing pattern indicative of unintended dialing may specify physical attribute values such as a low ambient light level, a random or upside-down orientation, random motion, and/or physical objects surrounding the phone device before, during, and/or after a phone dialing event. The determined phone dialing pattern may likewise specify physical attribute values such as a low ambient light level, a random or upside-down orientation, random motion, and/or physical objects surrounding the phone device before, during, and/or after a phone dialing event. A comparison of each physical attribute across the phone dialing patterns will show that all physical attribute values in the determined phone dialing pattern match the physical attribute values in the predefined phone dialing pattern. Based on the results of this comparison, detection facility 102 may determine that the determined phone dialing pattern matches the predefined phone dialing pattern indicative of unintended dialing.

As shown in FIG. 3, detection heuristic 300 may also include a match determination heuristic 304 that specifies a set of physical attributes to be used to determine whether a phone dialing pattern matches a predefined phone dialing pattern. The set of physical attributes specified by match determination heuristic 304 may be the same or different from the set of physical attributes specified by pattern generation heuristic 302. Match determination heuristic 304 may further specify how values for the specified physical attributes are to be used to determine whether a match exists, including in any of the ways described herein.

For example, match determination heuristic 304 may specify one or more thresholds to be satisfied in order for detection facility 102 to determine that phone dialing patterns match and/or that physical attribute values match across phone dialing patterns. To illustrate, a predefined phone dialing pattern may specify a predefined ambient light brightness value. Match determination heuristic 304 may specify a threshold within which an ambient light brightness value specified by a determined phone dialing pattern should be (e.g., within plus or minus five lumens or other brightness units of the predefined value, or equal to or less than the predefined value) in order to be identified as matching the predefined ambient light brightness value of the predefined phone dialing pattern. The thresholds may be defined in any suitable way and to have any suitable values, such as values designed to minimize false-positive matches, provide a desired level of sensitivity in detecting unintended dialing, and/or as that may suit a particular implementation.

As another example, match determination heuristic 304 may specify one or more weights to be applied to values of physical attributes associated with a phone device and/or to physical attribute match values to determine whether phone dialing patterns match. Accordingly, one or more of the physical attributes used to determine whether a match exists between phone dialing patterns may be weighted to control the extent to which specific physical attributes contribute to an overall determination. For example, an ambient light value and a motion value may be weighted such that the ambient light value provides a greater contribution than the motion value to the overall determination. Weighting of the physical attributes in this or a similar manner may be advantageous for one or more reasons. For instance, the ambient light value may have been determined to be a more accurate indicator of unintentional dialing than the motion value. Accordingly, more weight may be assigned to the ambient light value by the detection heuristic.

Match determination heuristic 304 may specify one or more phone dialing pattern match recognition processes that may be performed by detection facility 102 to determine whether a phone dialing pattern matches a predefined phone dialing pattern. Such a process may specify how one or more equations, thresholds, weighting values, physical attribute values, etc. will be used to determine whether a pattern match exists.

An exemplary match recognition process specified by match determination heuristic 304 and that may be performed by detection facility 102 will now be described. The process is illustrative only. Additional and/or alternative processes may be used in other examples.

At part of the process, detection facility 102 may compare values of physical attributes included in a determined phone dialing pattern to values of corresponding physical attributes included in a predefined phone dialing pattern. For each comparison of corresponding physical attributes (e.g., a comparison of an ambient light level specified by a determined phone dialing pattern to an ambient light level specified by predefined phone dialing pattern), detection facility 102 may assign an attribute match value.

Figure 4:
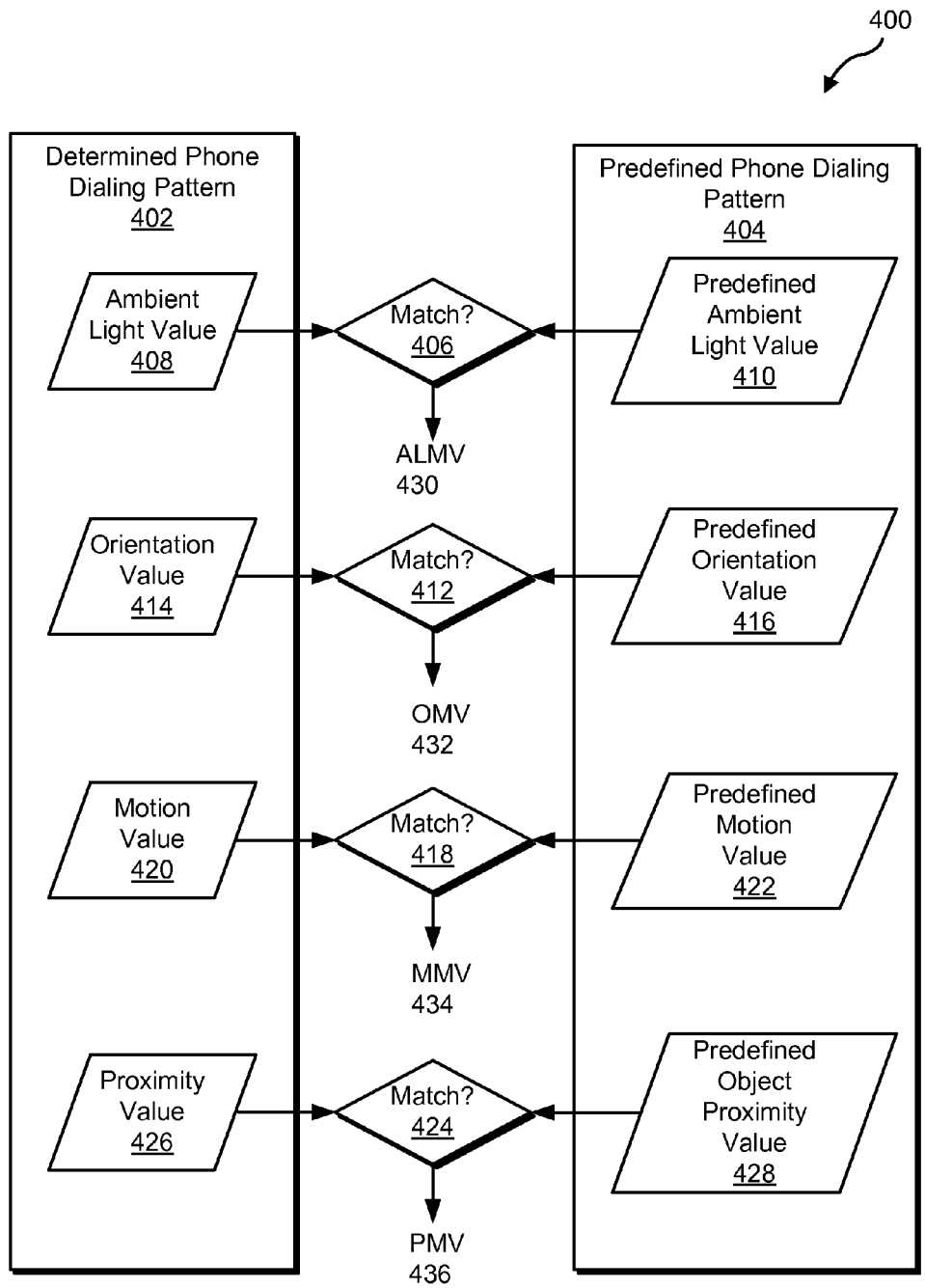
FIG. 4 illustrates an exemplary match comparison of values of corresponding physical attributes across phone dialing patterns according to principles described herein.

FIG. 4 illustrates a visual representation 400 of exemplary match comparisons of corresponding physical attributes across a determined phone dialing pattern 402 and a predefined phone dialing pattern 404. As shown, detection facility 102 may determine whether an attribute match exists across the phone dialing patterns 402 and 404 for ambient light, orientation, motion, and object proximity values specified by phone dialing patterns 402 and 404.

At function 406, detection facility 102 determines whether an ambient light value 408 of the determined phone dialing pattern 402 matches a predefined ambient light value 410 of the predefined phone dialing pattern 404. The criteria for a match to be found at function 406 may be defined as may suit a particular implementation. For example, detection facility 102 may determine that a match exists at function 406 if ambient light value 408 represents light conditions that are equal to or darker than the light conditions represented by predefined ambient light value 410.

At function 412, detection facility 102 determines whether an orientation value 414 of the determined phone dialing pattern 402 matches a predefined orientation value 416 of the predefined phone dialing pattern 404. The criteria for a match to be found at function 412 may be defined as may suit a particular implementation. For example, detection facility 102 may determine that a match exists at function 412 if orientation value 414 represents a phone device orientation that is substantively the same as the phone device orientation represented by predefined orientation value 416.

At function 418, detection facility 102 determines whether a motion value 420 of the determined phone dialing pattern 402 matches a predefined motion value 422 of the predefined phone dialing pattern 404. The criteria for a match to be found at function 418 may be defined as may suit a particular implementation. For example, detection facility 102 may determine that a match exists at function 418 if motion value 420 represents one or more motions of a phone device that are substantively the same as one or more predefined motions of a phone device represented by motion value 422.

At function 424, detection facility 102 determines whether an object proximity value 426 of the determined phone dialing pattern 402 matches a predefined object proximity value 428 of the predefined phone dialing pattern 404. The criteria for a match to be found at function 424 may be defined as may suit a particular implementation. For example, detection facility 102 may determine that a match exists at function 424 if proximity value 426 represents one or more characteristics of physical objects proximate a phone device and that are substantively the same as characteristics of physical objects represented by predefined object proximity value 428.

As part of the process, detection facility 102 may determine a match value for each comparison of values for corresponding physical attributes. The match value may depend on the outcome of each comparison. For example, detection facility 102 may determine an ambient light match value ("ALMV") 430 based on the comparison at function 406, an orientation match value ("OMV") 432 based on the comparison at function 412, a motion match value ("MMV") 434 based on the comparison at function 418, and a proximity match value ("PMV") 436 based on the comparison at function 424.

In certain examples, if a match is found by a comparison function, the match value associated with the comparison function may be assigned a value of "1." If a match is not found by the comparison function, the match value associated with the comparison function may be assigned a value of "0." For example, ALMV may equal "1" if a match is found at function 406, or ALMV may equal "0" if a match is not found at function 406.

As part of the process, detection facility 102 may use the determined match values of the comparisons of physical attribute values across phone dialing patterns 402 and 404 to determine whether the determined phone dialing pattern 402 matches the predefined phone dialing pattern 404. In certain examples, this determination may include detection facility 102 summing the match values 430, 432, 434, and 436 and determining whether the sum satisfies a predefined threshold. If the sum satisfies the predefined threshold ("PT"), detection facility 102 may determine that the determined phone dialing pattern 402 matches the predefined phone dialing pattern 404. The following equation illustrates this case: ALMV+OMV+MMV+PMV>=PT.

To illustrate, in certain examples, the predefined threshold may equal "4" to require that all four of the corresponding physical attributes shown in FIG. 4 match across the phone dialing patterns 402 and 404 being compared. If a match is found for each of the four corresponding physical attributes at functions 406, 412, 418, and 424, each of the match values will be set equal to "1." The match values will then be added to equal a sum of "4," which equals and will be determined to satisfy the predefined threshold of "4." In other examples, the predefined threshold may equal another number, such as, for example, "3" to require that three out of four of the corresponding physical attributes shown in FIG. 4 match across the phone dialing patterns 402 and 404 being compared in order for detection facility 102 to determine that phone dialing patterns 402 and 404 match.

In certain examples, detection facility 102 may be configured to weight one or more of the match values as part of the process. For example, a particular match value may be multiplied by a weight value, and the product of the multiplication used in the summation of the match values described above. To illustrate, the process may specify that ALMV 430 is to be weighted to potentially increase the extent to which ALMV 430 will contribute to the sum. For instance, ALMV 430 may be multiplied by a weight value of "2" to potentially double the contribution of ALMV 430 to the sum. The following equation illustrates this case: 2(ALMV)+OMV+MMV+PMV>=PT. Such a weighting may be advantageous in certain implementations, such as when ambient light associated with a phone device is a more reliable predictor of unintended dialing than is the motion of a phone device, as described above.

As mentioned, a phone dialing pattern may specify physical attributes associated with a phone device as the attributes existed before, during, and/or after a phone dialing event (e.g., before, during, and/or after an occurrence and/or detection of a phone dialing event). For example, a phone dialing pattern may specify a snapshot of a set of values for a set of physical attributes at one or more times relative to a time of a phone dialing event.

Figure 5:
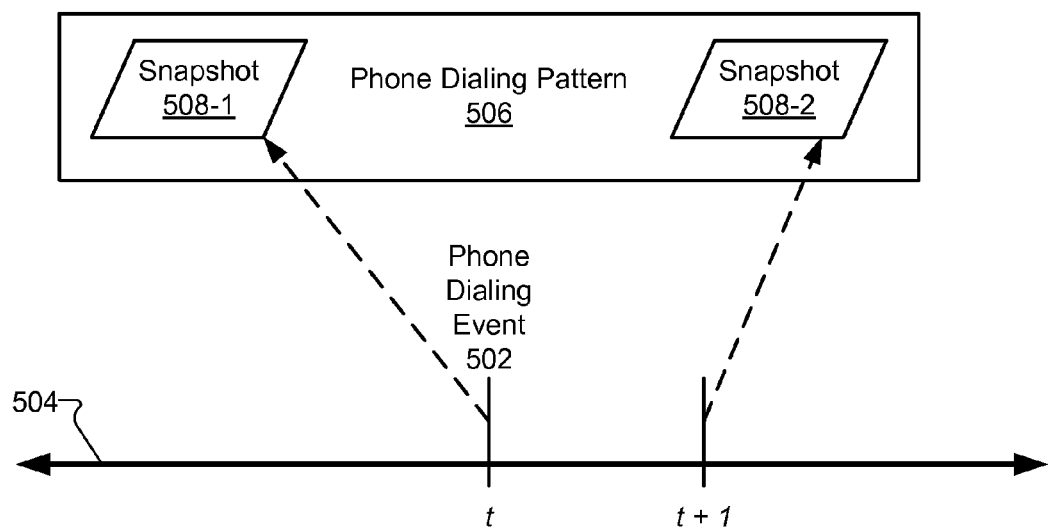
FIG. 5 illustrates exemplary timing of physical attribute snapshots associated with a phone dialing event according to principles described herein.

To illustrate, FIG. 5 shows a detection of a phone dialing event 502 at time "t" on a timeline 504. Detection facility 102 may be configured to generate a phone dialing pattern 506 associated with phone dialing event 502 to include snapshots 508 (e.g., snapshots 508-1 and 508-2) of physical attribute values associated with a phone device at one or more times relative to time "t." For example, detection facility 102 may generate the phone dialing pattern 506 to include data representative of ambient light, orientation, motion, and object proximity values associated with the phone device as the values existed at time "t." Detection facility 102 may generate the phone dialing pattern 506 to also include data representative of ambient light, orientation, motion, and object proximity values associated with the phone device as the values existed at time "t+1." Accordingly, the phone dialing pattern 506 associated with phone dialing event 502 may include snapshots 508-1 and 508-2 of set of values of the set of physical attributes at times "t" and "t+1," respectively.

Predefined phone dialing patterns included in a pattern database may also include data representative of multiple snapshots of sets of values for the set of physical attributes associated with multiple times relative to a phone dialing event. Accordingly, when a determined phone dialing pattern that includes physical attribute snapshots of multiple times is compared to a predefined dialing pattern that includes multiple physical attribute value snapshots to determine whether the determined phone dialing pattern matches the predefined phone dialing pattern, attribute values for corresponding snapshots (e.g., snapshots associated with corresponding times) may be compared.

To illustrate, snapshot 508-1 at time "t" may include ambient light, orientation, motion, and proximity values as they existed at time "t." These values may be compared to corresponding attribute values specified by a predefined phone dialing pattern as being associated with time "t" (the time of the phone dialing event). The comparison may be made as shown in FIG. 4 and may generate match values ALMV 430, OMV 432, MMV 434, and PMV 436 for time "t," which may be referred to as $ALMV_t$, $OMV_t$, $MMV_t$, and $PMV_t$.

Snapshot 508-2 at time "t+1" may include ambient light, orientation, motion, and proximity values as they existed at time "t+1." These values may be compared to corresponding attribute values specified by the predefined phone dialing pattern as being associated with time "t+1" (a time that follows the phone dialing event by a predefined duration such as one or more seconds after the phone dialing event). The comparison may be made as shown in FIG. 4 and may generate match values ALMV 430, OMV 432, MMV 434, and PMV 436 for time "t+1," which may be referred to as $ALM_{t+1}$, $OM_{t+1}$, $MMV_{t+1}$, and $PMV_{t+1}$.

Detection facility 102 may insert these values into one or more equations defined by match determination heuristic 304 to determine whether the determined phone dialing pattern matches the predefined phone dialing pattern. In certain examples, detection facility 102 may sum the match values for times "t" and "t+1" and determine whether the sum satisfies a predefined threshold. If the sum satisfies the predefined threshold ("PT"), detection facility 102 may determine that the determined phone dialing pattern matches the predefined phone dialing pattern. The following equation illustrates this case: $ALMV_t + OWV_t + MMV_t + PMV_t + ALMV_{t+1} + OMV_{t+1} + MMV_{t+1} + PMV_{t+1} >= PT$.

In certain examples, detection facility 102 may be configured to weight one or more of the match values as defined by match determination heuristic 304. For example, a match value may be multiplied by a weight value, and the product of the multiplication used in the summation of the match values, such as described above. The following equation illustrates such a case in which instances of ALMV for times "t" and "t+1" are multiplied by two: $2(ALMV_t) + OMV_t + MMV_t + PMV_t + 2(ALMV_{t+1}) + OMV_{t+1} + MMV_{t+1} + PMV_{t+1} >= PT$.

Additionally or alternatively, in certain examples, detection facility 102 may be configured to weight one or more snapshots as defined by match determination heuristic 304. For example, the sum of values for snapshot 508-1 may be multiplied by a weight value, and the product of the multiplication used in the summation of all match values. The following equation illustrates such a case in which the sum of match values for snapshot 508-1 associated with time "t" is multiplied by two: $2(ALMV_t + OMV_t + MMV_t + PMV_t) + ALMV_{t+1} + OMV_{t+1} + MMV_{t+1} + PMV_{t+1} >= PT$. Such a weighting may be advantageous such as when a snapshot of attribute values at a particular time relative to a phone dialing event (e.g., at the time of the phone dialing event) is a better predictor of unintended dialing than is a snapshot of attribute values at another time (e.g., a time after the phone dialing event).

Returning to FIG. 1, in response to a determination by detection facility 102 that a determined phone dialing pattern associated with a phone dialing event of a phone device matches a predefined phone dialing pattern indicative of unintended dialing, prevention facility 104 may automatically perform one or more operations to prevent placement of a phone call in response to the phone dialing event. In certain examples, the operation may include canceling a dialing, such as by canceling or preventing initiation of placement of a phone call in response to the phone dialing event. In certain examples, the operation may include prompting a user of the phone device for call confirmation, such as by prompting the user to provide input confirming that the phone dialing event is intended before executing placement of a phone call in response to the phone dialing event. In certain examples, the operation may include locking the phone device (e.g., locking the touch screen and/or keypad) such that the phone device will not accept and/or act on dial input received by the phone device while the phone device is locked. In certain implementations, system 100 may auto-lock the phone device when a pattern match indicates that the phone device has been placed into a user's pocket or handbag (e.g., when ambient light and object proximity values indicate a drop in ambient light below a predefined brightness level and that physical objects are next to the front and back of the phone device.

In certain examples, the operation that is performed by prevention facility 104 is selected by prevention facility 104 based on a user preference defined by a user and stored by prevention facility 104. For example, a user of the phone device may configure the phone device to automatically cancel a dialing when detection facility 102 determines that a phone dialing event is indicative of unintended dialing. Alternatively, the user of the phone device may configure the phone device to automatically prompt the user for confirmation when detection facility 102 determines that a phone dialing event is indicative of unintended dialing.

Different users may have different dialing patterns, and one or more elements used to detect unintended dialing may be tailored to a user of a phone device based on dialing behavior associated with the phone device. Such tailoring may increase the effectiveness and/or accuracy of a system in detecting and preventing unintended dialing.

Figure 6:
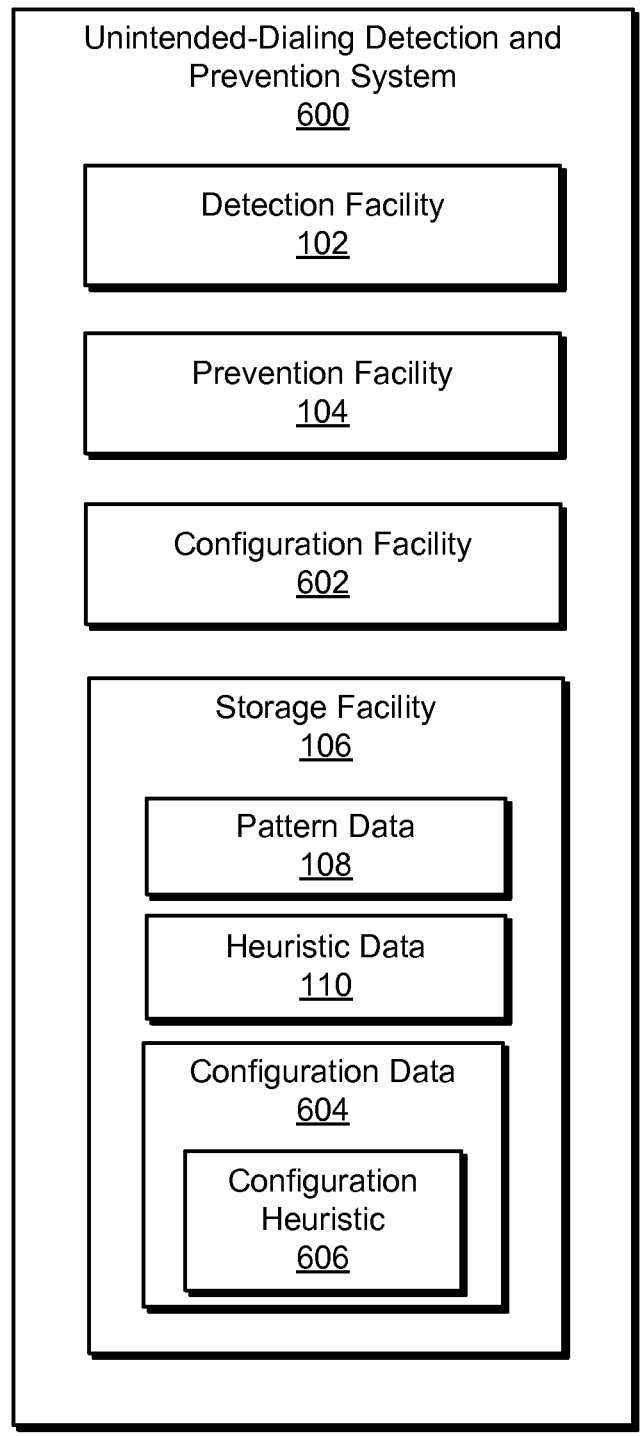
FIG. 6 illustrates an exemplary unintended-dialing detection and prevention system according to principles described herein.

In certain examples, elements of a system may be automatically tailored. To illustrate, FIG. 6 shows an unintended-dialing detection and prevention system 600 ("system 600"). As shown, system 600 may include the detection facility 102, prevention facility 104, and storage facility 106 of system 100. In addition, system 600 may include a configuration facility 602 that is configured to automatically tailor one or more elements of system 600 based on dialing behavior associated with a phone device. To this end, configuration facility 602 may communicate with detection facility 102, prevention facility 104, and/or storage facility 106 to obtain information from and/or to update one or more elements of these facilities, including in any of the exemplary ways described herein.

Detection facility 102 may maintain, in storage facility 106, pattern data 108 representative of a set of predefined phone dialing patterns (e.g., a set of predefined phone dialing patterns indicative of unintended dialing). Initially, such as when system 600 is initially installed on a phone device, the set of predefined phone dialing patterns may include one or more predefined phone dialing patterns that have been defined (e.g., by a provider of system 600 and/or the phone device) based on common dialing behavior of many users and/or phone devices. For example, an initial predefined phone dialing pattern indicative of unintended dialing may be defined to include values of a set of physical attributes associated with a phone device that are commonly and/or generally associated with unintended dialing.

Detection facility 102 may also maintain, in storage facility 106, heuristic data 110 representative of an unintended-dialing detection heuristic (e.g., detection heuristic 300). Initially, such as when system 600 is initially installed on a phone device, the detection heuristic may specify an initial set of physical attributes associated with a phone device to be used to generate a phone dialing pattern, how values for the specified physical attributes are to be gathered, formatted, and/or used to generate the phone dialing pattern, an initial set of physical attributes associated with a phone device to be used to determine whether the generated phone dialing pattern matches a predefined phone dialing pattern, and how values for the specified physical attributes are to be used to determine whether a match exists. The initial information specified by the detection heuristic may be defined based on and/or to account for characteristics commonly and/or generally associated with unintended dialing.

Configuration facility 602 may be configured to monitor, over time, phone dialing behavior associated with a phone device. For example, configuration facility 602 may communicate with detection facility 102 to obtain information about phone dialing events, phone dialing patterns associated with the phone dialing events, whether the phone dialing events are determined to be intended or unintended by detection facility 102, user input confirming that phone dialing events are intended or unintended, and any other information associated with dialing behavior associated with the phone device. Configuration facility 602 may obtain such information over time such that the information represents historical dialing behavior associated with the phone device.

Configuration facility 602 may be configured to maintain, in storage facility 106, configuration data 604 that may represent the information obtained from detection facility 102 and a configuration heuristic that specifies one or processes that may be executed by configuration facility 602 to process the information and to automatically tailor detection facility 102. Accordingly, configuration facility 602 may automatically tailor detection facility 102 based on the configuration heuristic and the historical phone dialing behavior associated with the phone device.

In certain examples, tailoring of detection facility 102 may include tailoring the set of predefined phone dialing patterns maintained by detection facility 102 (in pattern data 108 in storage facility 106). The tailoring may include adding data representative of a new predefined phone dialing pattern to the set of predefined phone dialing patterns, modifying an existing predefined phone dialing pattern included in the set of predefined phone dialing patterns, and/or deleting an existing predefined phone dialing pattern from the set of predefined phone dialing patterns.

To illustrate, through an analysis of historical dialing behavior associated with a phone device, configuration facility 602 may determine that a particular phone dialing pattern is associated with unintended dialing. For instance, the phone dialing pattern may be determined to be associated with one or more unintended phone dialing events (e.g., a predefined number of unintended phone dialing events). The determination that the phone dialing events associated with the phone dialing pattern are unintended may be made in any suitable way, such as by detection facility 102 determining that the phone dialing pattern matches a predefined phone dialing pattern, which may "match" but not be identical to the phone dialing pattern, or by receipt of user input indicating that the phone dialing events are unintended. In response to the determination, configuration facility 602 may add data representative of the phone dialing pattern to the set of predefined phone dialing patterns as a new predefined phone dialing pattern in the set. This may help improve the accuracy of detection facility 102 in detecting that future phone dialing events associated with phone dialing patterns that "match" the new predefined phone dialing pattern are unintended.

In certain examples, tailoring of detection facility 102 may include tailoring the detection heuristic maintained by detection facility 102 (in heuristic data 110 in storage facility 106). The tailoring may include modifying the detection heuristic to specify a new set of physical attributes associated with the phone device to be used by detection facility 102 in the detecting of unintended dialing on the phone device (e.g., to generate a phone dialing pattern and to determine whether the phone dialing pattern matches a predefined phone dialing heuristic indicative of unintended dialing). The new set of physical attributes may be defined by adding one or more new attributes to the set and/or removing one or more of the attributes included in the set from the set.

To illustrate, through an analysis of historical dialing behavior associated with a phone device, configuration facility 602 may determine that certain sensor data is generally not predictive of unintended dialing. For example, a user may have a habit of placing his or her phone device at a generally upright orientation in his or her pocket. The user may also generally hold the phone device at a similar orientation when intentionally dialing. Accordingly, the orientation of the phone device may be generally upright for both intended and unintended phone dialing events. Configuration facility 602 may determine from an analysis of historical dialing behavior associated with the phone device that the orientation of the phone device is generally not predictive of unintended dialing. In response, configuration facility 602 may modify the detection heuristic such as by removing the orientation of the phone device from the set of physical attributes associated with the phone device to be used by detection facility 102 in the detecting of unintended dialing on the phone device. Accordingly, detection facility 102 will no longer use the orientation of the phone device in detecting unintended dialing, which may conserve resources of the phone device.

In certain examples, tailoring of detection facility 102 may include modifying the detection heuristic to weight the contribution of one or more of the physical attributes included in the set of physical attributes associated with the phone device to be used by detection facility 102 in the detecting of unintended dialing on the phone device. The weighting may include configuration facility 602 adding, modifying, and/or removing weight values in the detection heuristic.

To illustrate, through an analysis of historical dialing behavior associated with a phone device, configuration facility 602 may determine that certain sensor data is a better predictor of unintended dialing than is other sensor data. For example, a user of the phone device may have a habit of placing his or her phone device at a generally upside-down orientation in his or her pocket. The user may also generally hold the phone device at a generally upright orientation when intentionally dialing. Accordingly, the orientation of the phone device may be generally upright for intended phone dialing event and generally upside-down for unintended phone dialing events. Configuration facility 602 may determine this from an analysis of historical dialing behavior associated with the phone device and identify the orientation of the phone device as being a reliable predictor of unintended dialing, even more reliable than one or more other physical attributes associated with the phone device. In response, configuration facility 602 may modify the detection heuristic such as by weighting the extent to which the orientation of the phone device will contribute (e.g., by applying a weight value to an orientation value and/or orientation match value) in determining whether future phone dialing events are unintended.

The above-described examples of tailoring detection facility 102 are illustrative only. Configuration facility 602 may tailor detection facility 102 in additional and/or alternatively ways based on other historical dialing behavior associated with a phone device. The tailoring may be said to tailor one or more element of system 600 to the historical phone dialing behavior associated with the phone device.

As mentioned, configuration facility 602 may be configured to maintain a configuration heuristic. FIG. 6 shows configuration data 604 to include a configuration heuristic 606. Configuration facility 602 may be configured to tailor detection facility 102 (or any element(s) of detection facility 102 or system 600) based on configuration heuristic 606.

Configuration heuristic 606 may be defined as may suit a particular implementation and specify one or more criteria to be used by configuration facility 602 to configure detection facility 102. For example, configuration facility 602 may specify, without limitation, historical dialing behavior data to be obtained, historical dialing behavior data to be analyzed, one or more operations to be performed to analyze the historical dialing behavior data, and one or more configuration triggers, conditions, and/or thresholds configured to cause configuration facility 602 to automatically tailor detection facility 102.

In certain examples, configuration heuristic 606 may define one or more machine learning processes configured to be performed to select and/or weight physical attributes for the detecting of unintended dialing by detection facility 102, such as described above. In certain examples, the machine learning process(es) may be configured to initiate tailoring of detection facility 102 in response to user-provided input, such as user confirmation of intended and/or unintended dialing. In such examples, the machine learning processes may be referred to as user-feedback-based and/or user-supervised machine learning processes.

In certain examples, system 100 or system 600 may be configured to accommodate one or more noise factors (e.g., environment noise factors) in data acquired by sensors (e.g., sensors 202). For example, one or more noise filters may be employed by detection facility 102 to filter noise and/or improve accuracy.

In certain examples, for instance, a Kalman filter based approach may be used. In the approach, a series of measurements may be obtained over time, and a Kalman filter used to estimate values of sensor data based on previous estimations. To illustrate, detection facility 102 may be configured to use the following equation to calculate a current estimation: $X_k = (K_k)(Z_k) + (1-K_k)(X_{k-1})$, where $X_k$ is a current estimate of a signal x, which is a vector of a set of physical attributes associated with a phone device, $X_{k-1}$ is previous estimate of the signal x, which is a vector of the set of physical attributes associated with the phone device in the previous state, $Z_k$ is the measured value of the vector of the set of physical attributes associated with the phone device, and $K_k$ is a "Kalman Gain" as understood in the art.

This Kalman filter based approach is illustrative only. Other noise filters may be used in other examples.

Figure 7:
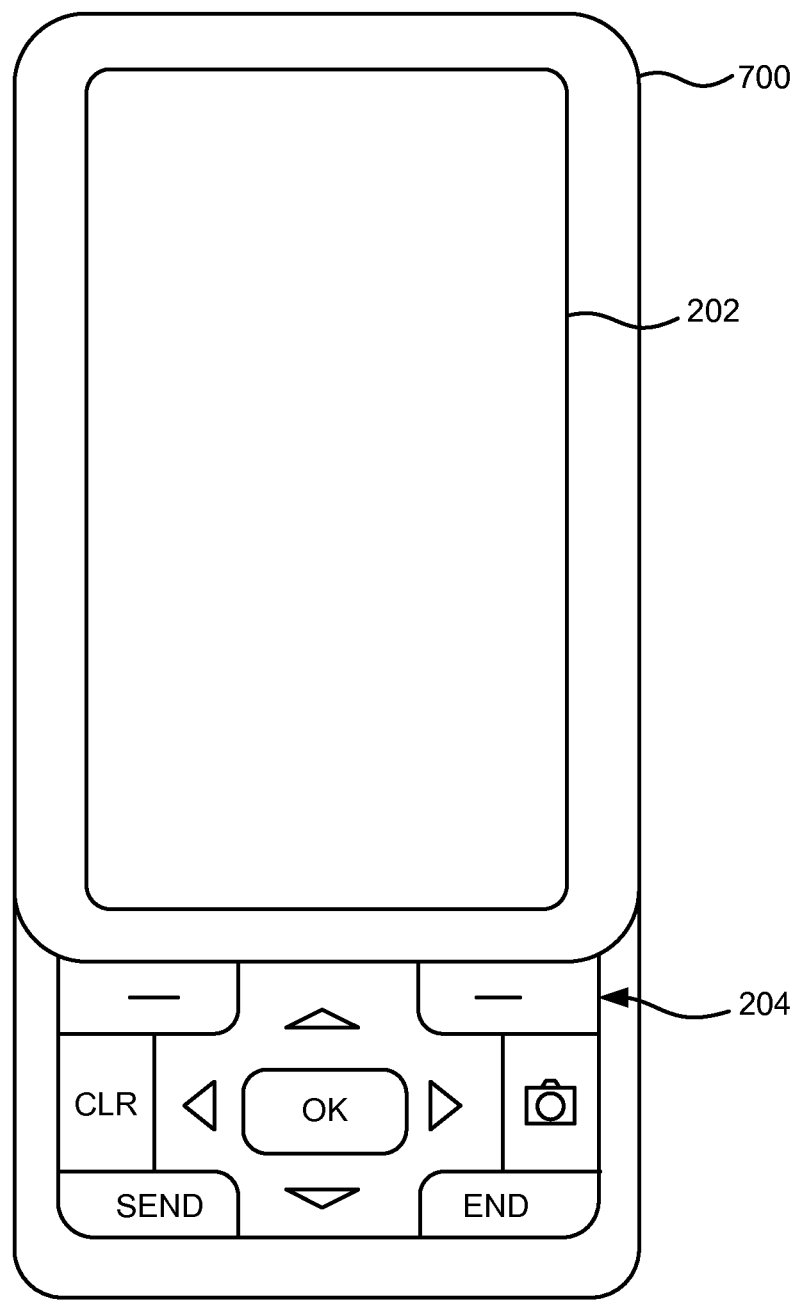
FIG. 7 illustrates an exemplary phone device implementing the system of FIG. 1 or the system of FIG. 6 according to principles described herein.

System 100 or system 600 may be implemented by one or more computing devices. For example, FIG. 7 illustrates an exemplary phone device 700 (or simply "device 700") having system 100 or system 600 implemented thereon. Device 700 may include one or more of the facilities 102-106 and 602 shown in FIG. 1 or FIG. 6 and may be configured to perform one or more of the processes and/or operations described herein. Device 700 may include, but is not limited to, a mobile phone device, a smart phone device, and/or any other user computing device capable of placing phone calls.

Device 700 may include a display screen 702 configured to display one or more GUIs for viewing by a user of device 700. In certain examples, display screen 702 may include a touch screen display configured to detect user input provided by a user by way of the touch screen display. In addition to display screen 702, device 700 may include other input mechanisms such as a keypad 204 that includes one or more input buttons 704.

Figure 8:
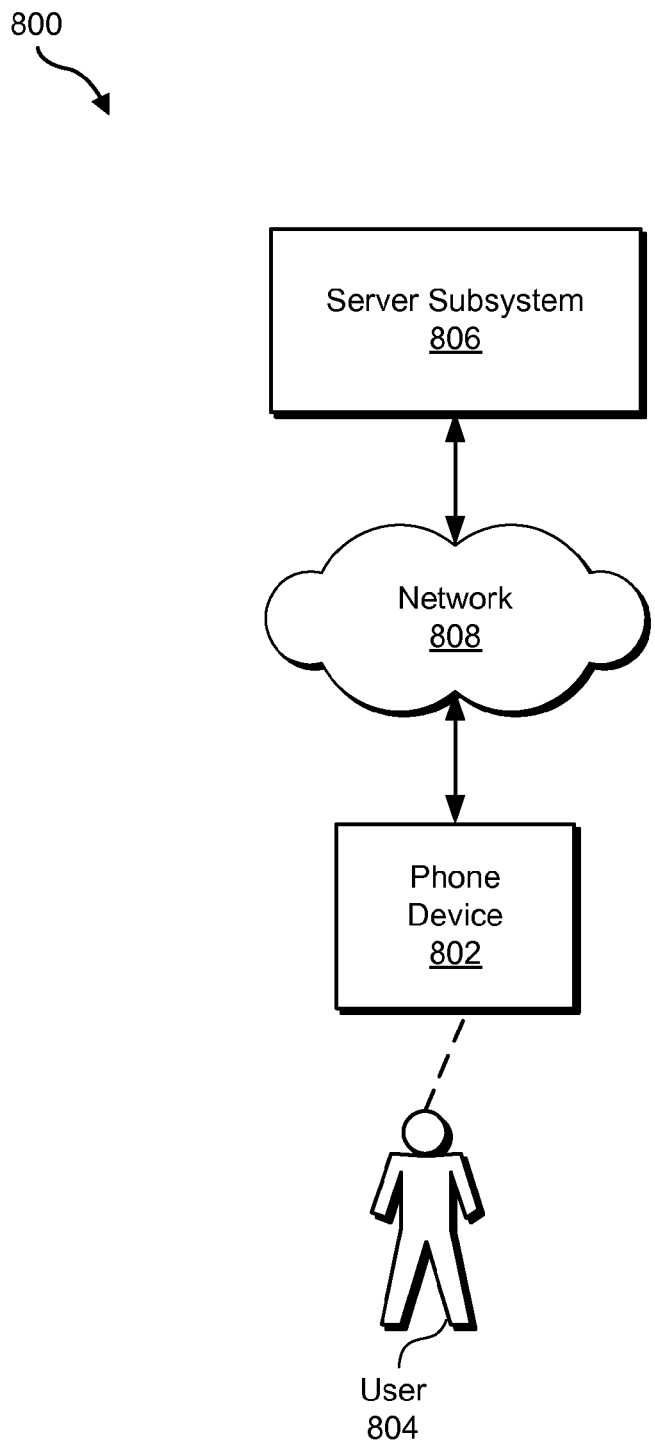
FIG. 8 illustrates an exemplary client-server implementation of the system of FIG. 1 or the system of FIG. 6 according to principles described herein.

As another example, FIG. 8 illustrates an exemplary implementation 800 in which system 100 or system 600 is implemented. As shown, implementation 800 may include a phone device 802 (e.g., a mobile phone device or any other device capable of placing phone calls) associated with a user 804 of phone device 802. Phone device 802 may be in communication with a server subsystem 806, which may include one or more computing devices (e.g., server devices remotely located from phone device 802). Phone device 802 and server subsystem 806 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications technologies.

In certain embodiments, phone device 802 and server subsystem 806 may communicate via a network 808. Network 808 may include one or more networks, such as one or more wireless networks (Wi-Fi networks), wireless communication networks, mobile telephone networks (e.g., cellular telephone networks), closed media networks, open media networks, closed communication networks, open communication networks, satellite networks, navigation networks, broadband networks, narrowband networks, voice communication networks (e.g., PSTN and/or VoIP networks), the Internet, local area networks, and any other networks capable of carrying data and/or communications signals between phone device 802 and server subsystem 806. Communications between phone device 802 and server subsystem 806 may be transported using any one of the above-listed networks, or any combination or sub-combination of the above-listed networks. Alternatively, phone device 802 and server subsystem 806 may communicate in another way such as by one or more direct connections between phone device 802 and server subsystem 806.

In implementation 800, elements (e.g., facilities 102-106 and 302) of system 100 or system 600 may be implemented entirely by phone device 802, entirely by server subsystem 806, or distributed across phone device 802 and server subsystem 806.

FIGS. 9-12 illustrate exemplary methods (i.e., methods 900, 1000, 1100, and 1200) of detecting and preventing unintended dialing by a phone device. While FIGS. 9-12 illustrate exemplary steps according to certain embodiments, other embodiments may omit, add to, reorder, combine, and/or modify any of the steps shown in FIGS. 9-12. One or more of the steps shown in certain methods illustrated in FIGS. 9-12 may be combined with and/or performed in conjunction with (e.g., performed before or after) one or more steps of one or more other methods illustrated in FIGS. 9-12. The methods illustrated in FIGS. 9-12 may be performed by any component or combination of components of an unintended-dialing detection and prevention system (e.g., system 100 or system 600), and/or one or more implementations of the unintended-dialing detection and prevention system (e.g., devices implementing system 100 or system 600).

Figure 9:
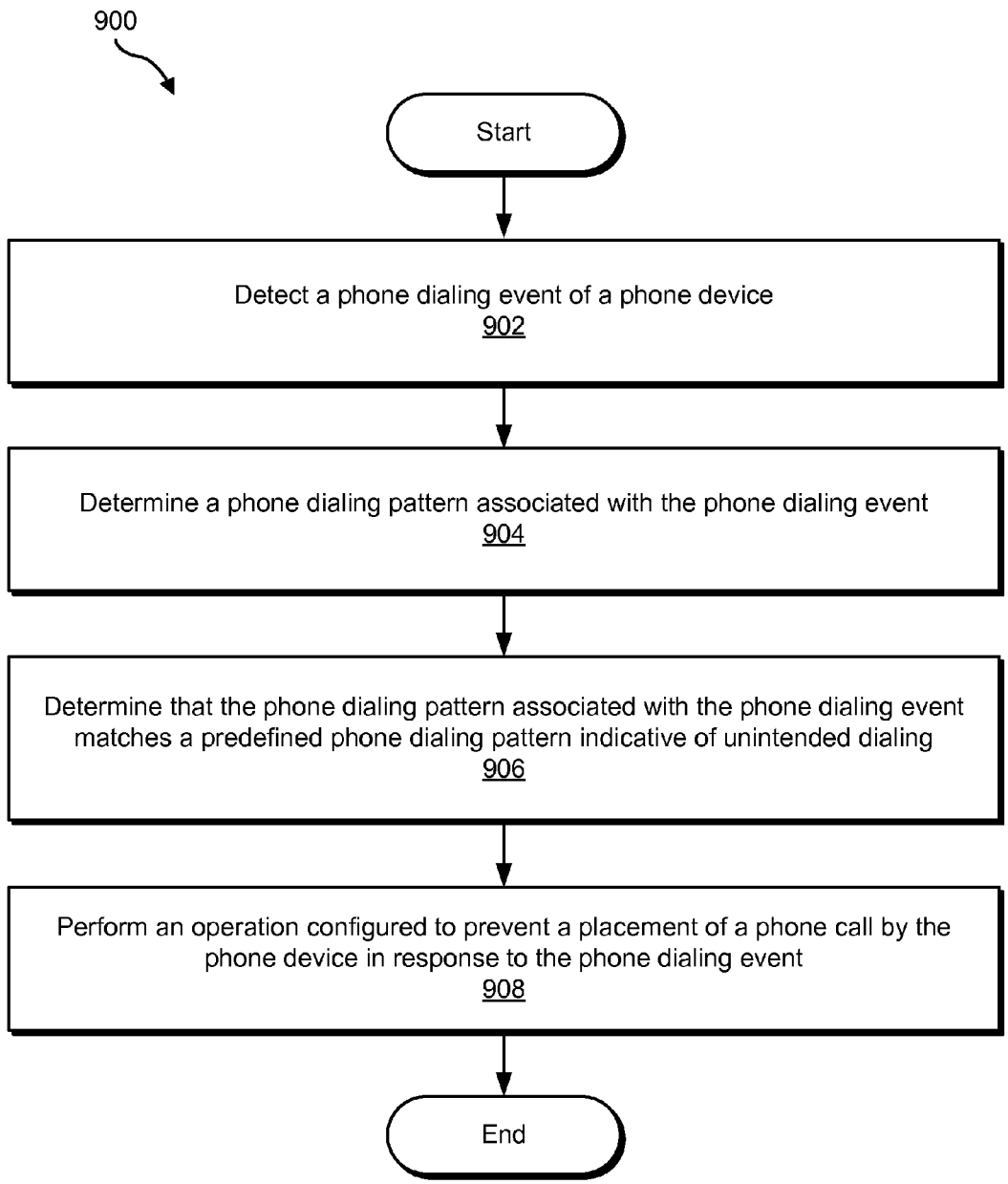
FIGS. 9-12 illustrate exemplary methods of detecting and preventing unintended dialing by a phone device according to principles described herein.

Turning to FIG. 9, in step 902, an unintended-dialing detection and prevention system ("the system") detects a phone dialing event of a phone device, such as described herein.

In step 904, the system determines a phone dialing pattern associated with the phone dialing event, such as described herein.

In step 906, the system determines that the phone dialing pattern associated with the phone dialing event matches a predefined phone dialing pattern indicative of unintended dialing, such as described herein.

In step 908, the system performs an operation configured to prevent a placement of a phone call by the phone device in response to the phone dialing event, such as described herein. Step 908 may be performed automatically (e.g., without human intervention) in response to the determination made in step 906.

Figure 10:
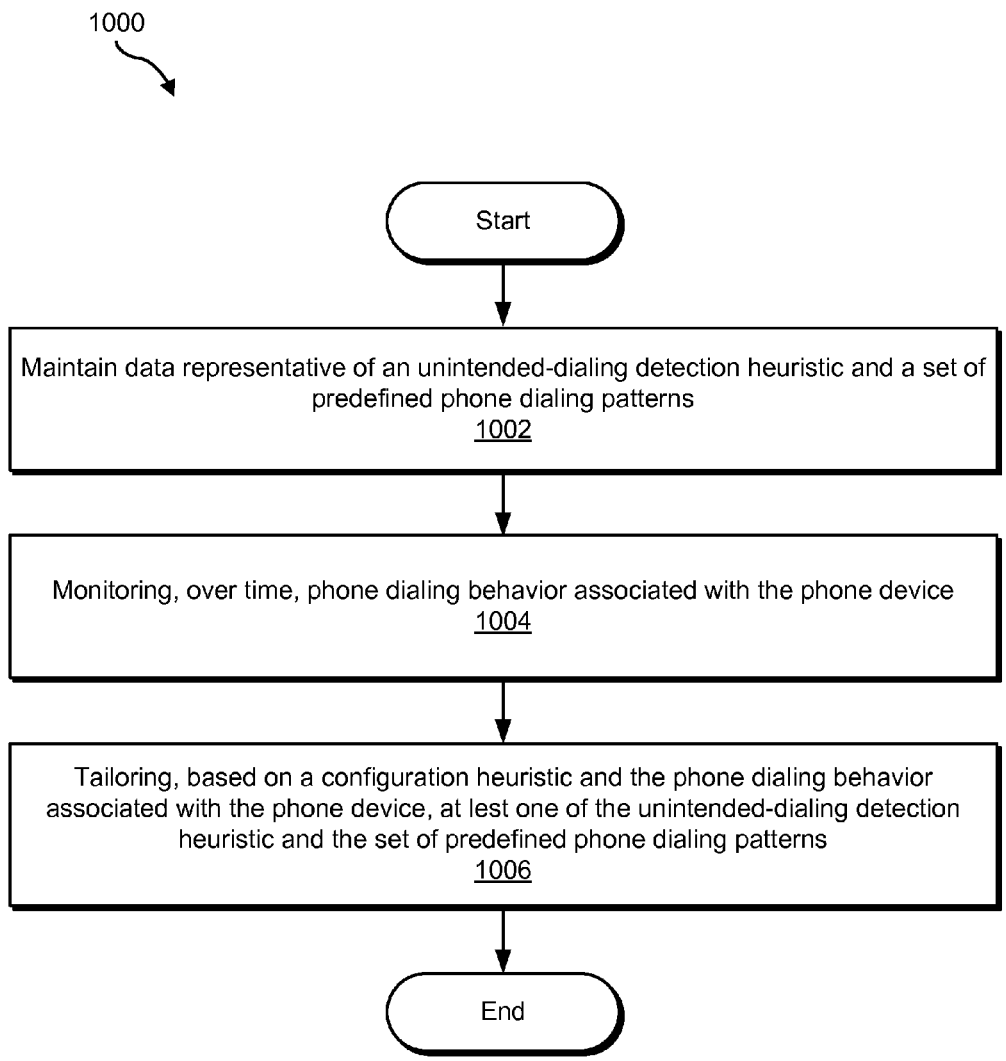

Turning to FIG. 10, in step 1002, an unintended-dialing detection and prevention system ("the system") maintains data representative of an unintended-dialing detection heuristic and a set of predefined phone dialing patterns for use in detecting unintended dialing on a phone device, such as described herein.

In step 1004, the system monitors, over time, phone dialing behavior associated with the phone device, such as described herein.

In step 1006, the system tailors, based on a configuration heuristic and the phone dialing behavior associated with the phone device and monitored in step 1004, at least one of the unintended-dialing detection heuristic and the set of predefined phone dialing patterns, such as described herein. Step 1006 may be performed automatically (e.g., without human intervention) in response to an occurrence of a trigger event specified by the configuration heuristic.

Figure 11:
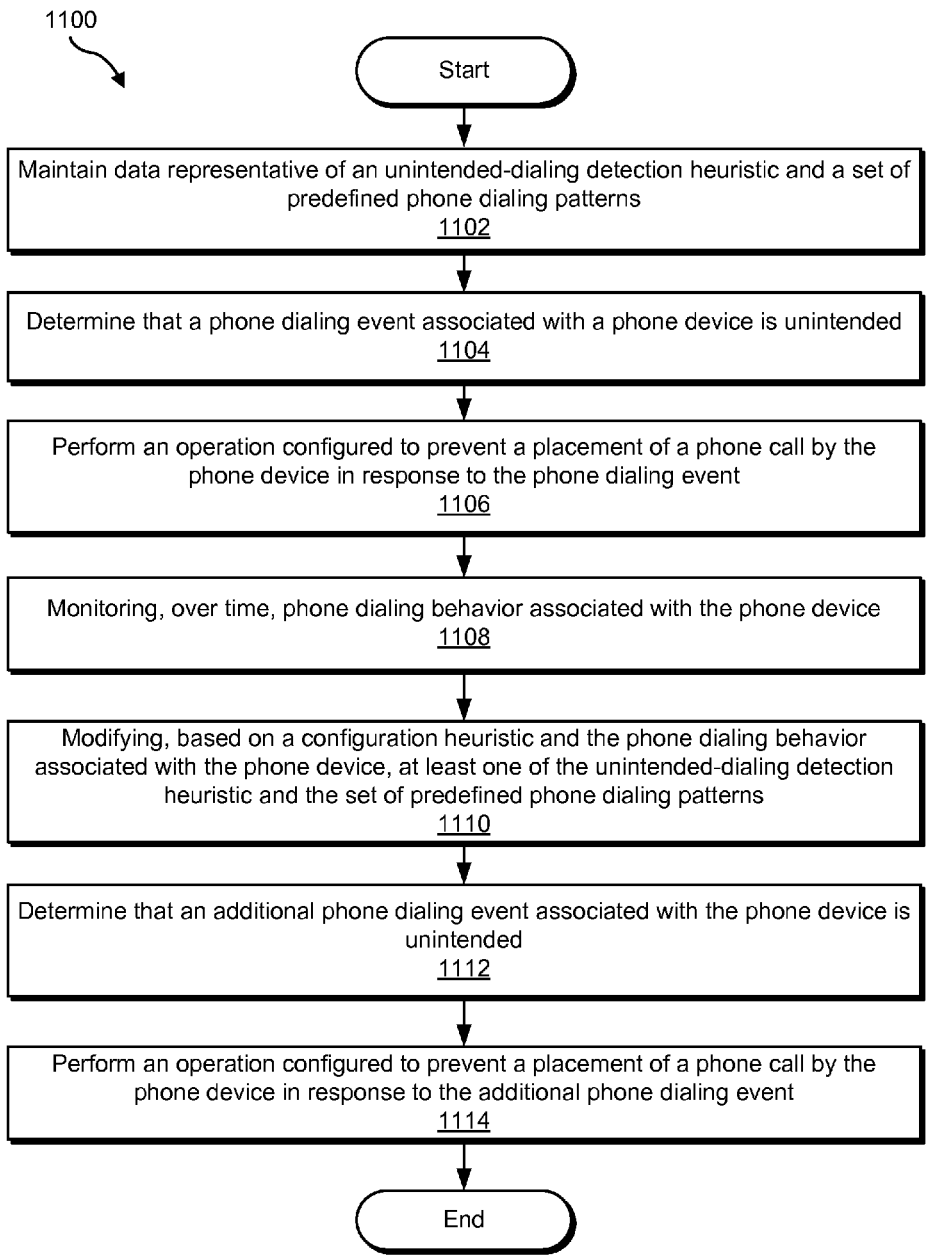

Turning to FIG. 11, in step 1102, an unintended-dialing detection and prevention system ("the system") maintains data representative of an unintended-dialing detection heuristic and a set of predefined phone dialing patterns, such as described herein.

In step 1104, the system determines, based on the unintended-dialing detection heuristic and a set of predefined phone dialing patterns, that a phone dialing event associated with a phone device is unintended. The determination may be made in any of the ways described herein.

In step 1106, the system performs an operation configured to prevent the placement of a phone call by the phone device in response to the phone dialing event, such as described herein. Step 1106 may be performed automatically in response to the determination made in step 1104.

In step 1108, the system monitors, over time, phone dialing behavior associated with the phone device, such as described herein.

In step 1110, the system modifies, based on a configuration heuristic and the phone dialing behavior associated with the phone device and monitored in step 1108, at least one of the unintended-dialing detection heuristic and the set of predefined phone dialing patterns. The modification may include any of the exemplary modifications described herein and may be configured to tailor at least one of the unintended-dialing detection heuristic and the set of predefined phone dialing patterns to the phone dialing behavior associated with the phone device.

In step 1112, the system determines, based on the modified at least one of the unintended-dialing detection heuristic and the set of predefined phone dialing patterns, that an additional phone dialing event associated with the phone device is unintended, such as described herein.

In step 1114, the system performs an operation configured to prevent a placement of a phone call by the phone device in response to the additional phone dialing event, such as described herein. Step 1114 may be performed automatically in response to the determination made in step 1112.

Figure 12:
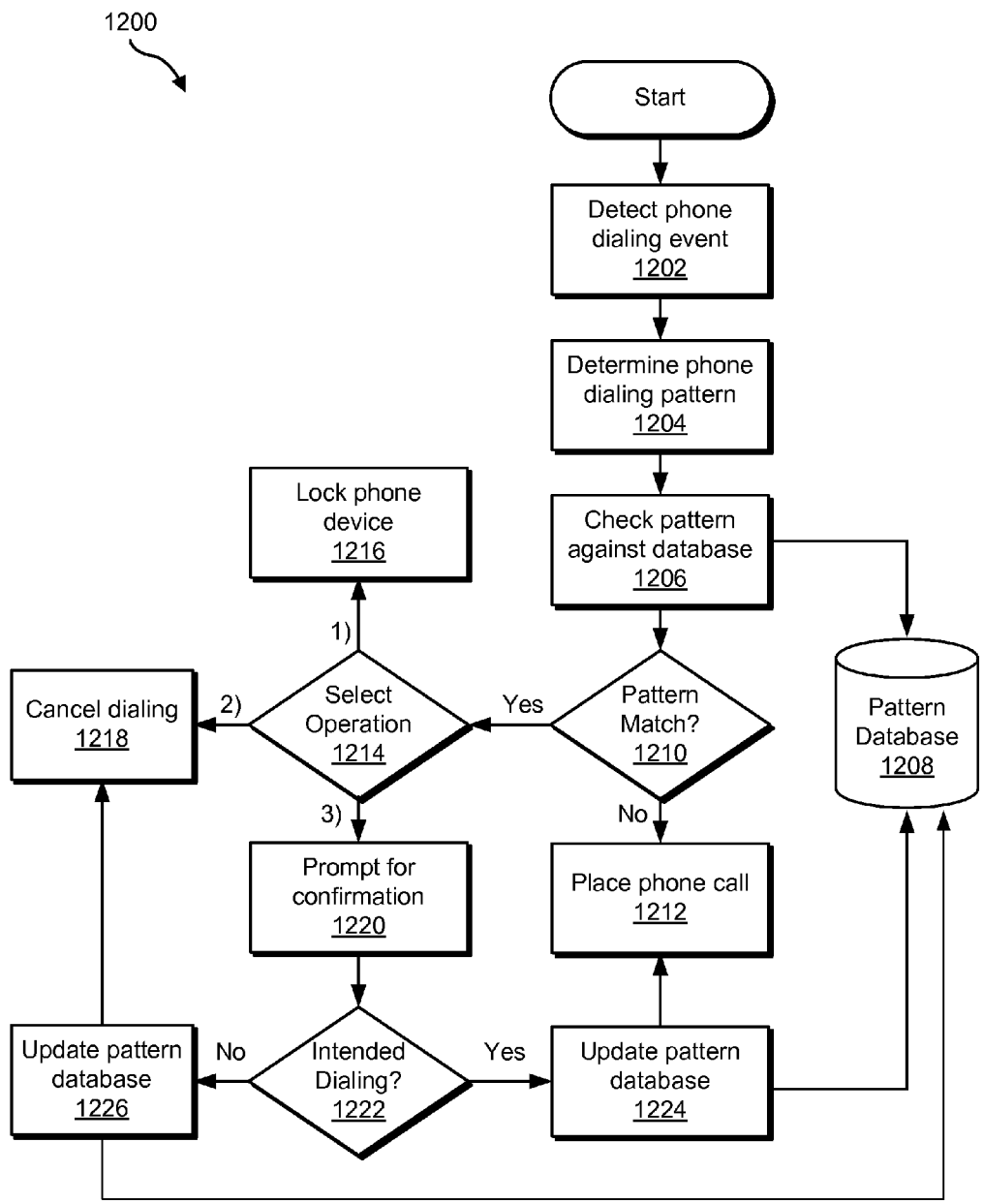

Turning to FIG. 12, in step 1202, an unintended-dialing detection and prevention system ("the system") detects a phone dialing event, such as described herein.

In step 1204, the system determines a phone dialing pattern associated with the phone dialing event, such as described herein.

In step 1206, the system checks the phone dialing pattern against a pattern database 1208, which may include data representative of a set of predefined phone dialing patterns that are indicative of unintended dialing. For example, the system may query the pattern database 1208 for a match to the phone dialing pattern. A predefined phone dialing pattern included in the pattern database 1208 and that matches the phone dialing pattern determined in step 1204 may be identified such as described herein. Alternatively, the system may not identify a matching predefined phone dialing pattern in pattern database 1208.

In step 1210, the system determines whether a match has been identified. Step 1210 may be performed in any suitable way.

If no match is identified, processing moves from step 1210 to step 1212. In step 1212, a phone device may place a phone call in response to the detected phone dialing event. Method 1200 then ends.

Alternatively, if a match is identified, processing moves from step 1210 to step 1214. In step 1214, the system selects an operation to perform in response to the determination that a match exists in step 1210. In certain examples, the system may select the operation based on a user-defined preference.

In certain examples, the system may select a phone lock operation. In such examples, processing moves from step 1214 to step 1216. In step 1216, the phone device is locked, such as described herein. Method 1200 then ends.

In other examples, the system may select a dialing cancellation operation. In such examples, processing moves from step 1214 to step 1218. In step 1218, the system cancels a dialing, such as by canceling a placement of a phone call in response to the phone dialing event detected in step 1202. Method 1200 then ends.

In other examples, the system may select a user confirmation operation. In such examples, processing moves from step 1214 to step 1220. In step 1220, the system prompts a user for confirmation that the phone dialing event is intended or unintended. The user may provide input to confirm either an intended or unintended dialing.

In step 1222, the system determines, based on user confirmation received in step 1220, whether the phone dialing event is intended or unintended.

If the dialing event is determined in step 1222 to be intended, processing moves from step 1222 to step 1224. In step 1224, the system updates pattern database 1208. The system may update pattern database 1208 in any of the ways described herein, such as by adding data representative of a new predefined phone dialing pattern to database 1208, or modifying or removing an existing predefined phone dialing patter from database 1208.

In addition, in response to a determination in step 1222 that the dialing event is intended, the phone device may place a phone call in response to the phone dialing event in step 1212. Method 1200 then ends.

Alternatively, if the dialing event is determined in step 1222 to be unintended, processing moves from step 1222 to step 1226. In step 1226, the system updates pattern database 1208. The system may update pattern database 1208 in any of the ways described herein, such as by adding data representative of a new predefined phone dialing pattern to database 1208, or modifying or removing an existing predefined phone dialing patter from database 1208. In some alternative implementations, step 1226 may be omitted from method 1200.

In addition, in response to a determination in step 1222 that the dialing event is unintended, the phone device cancels a dialing, such as by canceling a placement of a phone call in response to the phone dialing event detected in step 1202. Method 1200 then ends.

In certain embodiments, one or more of the components and/or processes described herein may be implemented and/or performed by one or more appropriately configured computing devices (e.g., a phone device and/or a server device). To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include and/or be implemented by any number of computing devices, and may employ and/or interface with any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 13:
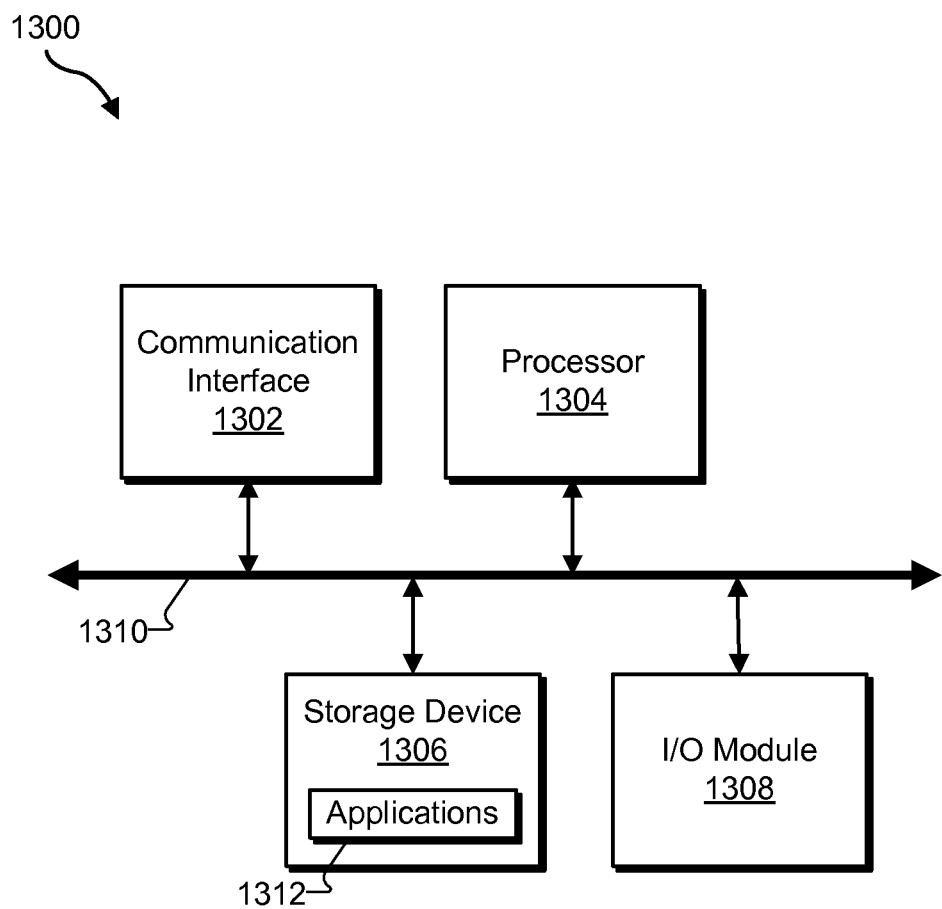
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a communications medium interface, a modem, and any other suitable interface. Communication interface 1302 may be configured to interface with any suitable communication media, protocols, and formats, including any of those mentioned above.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications described herein) configured to direct processor 1304 to perform any of the operations described herein may be stored within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with detection facility 102, prevention facility 104, and/or configuration facility 602. Likewise, storage facility 106 may be implemented by or within storage device 1306.

While examples described herein are directed to dialing associated with voice call communications, other implementations may be directed to dialing associated with other types of communications, such as dialing that may initiate text messaging, email, social networking messaging, and/or other types of communications. Additionally or alternatively, while some examples described herein employ a set of predefined phone dialing patterns indicative of unintended dialing, a set of predefined phone dialing patterns may alternatively include patterns indicative of intended dialing or may include patterns indicative of both intended and unintended dialing.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   determining, by an unintended-dialing detection and prevention system based on an unintended-dialing detection heuristic, a phone dialing pattern that is associated with a phone dialing event of a phone device and that specifies values for a set of physical attributes associated with the phone device and the phone dialing event, the set of physical attributes comprising a proximity of the phone device to one or more objects that are not associated with intended dialing;
   determining, by the unintended-dialing detection and prevention system based on the unintended-dialing detection heuristic, that the phone dialing pattern associated with the phone dialing event matches a predefined phone dialing pattern indicative of unintended dialing by comparing the values for the set of physical attributes specified by the phone dialing pattern to predefined values specified by the predefined phone dialing pattern and by determining a match value for each physical attribute included in the set of physical attributes based on the comparing, the predefined phone dialing pattern including different sets of predefined values for the set of physical attributes associated with the phone device at different time points; and
   automatically performing, by the unintended-dialing detection and prevention system in response to the determining that the phone dialing pattern associated with the phone dialing event matches the predefined phone dialing pattern indicative of the unintended dialing, an operation configured to prevent a placement of a phone call by the phone device in response to the phone dialing event.

2. The method of claim 1, further comprising:
   maintaining, by the unintended-dialing detection and prevention system, a database of predefined phone dialing patterns indicative of the unintended dialing, the predefined phone dialing pattern included in the database of predefined phone dialing patterns;
   wherein the determining that the phone dialing pattern associated with the phone dialing event matches the predefined phone dialing pattern indicative of the unintended dialing compromises querying the database for a match to the phone dialing pattern.

3. The method of claim 1, wherein the determining of the phone dialing pattern comprises:
   determining values for the set of physical attributes associated with the phone device at least one of before, during, and after the phone dialing event; and
   generating the phone dialing pattern to include data representative of the determined values for the set of physical attributes associated with the phone device.

4. The method of claim 3, wherein the set of physical attributes further comprises at least one of ambient light proximate the phone device, an orientation of the phone device, and a motion of the phone device.

5. The method of claim 1, wherein the determining of the phone dialing pattern comprises:
   determining a first set of values for the set of physical attributes associated with the phone device as the physical attributes exist at the phone dialing event;
   determining a second set of values for the set of the physical attributes associated with the phone device as the physical attributes exist after the phone dialing event; and
   generating the phone dialing pattern to include data representative of the determined first and second sets of values for the set of physical attributes associated with the phone device.

6. The method of claim 1, wherein:
   the set of physical attributes further comprises ambient light proximate the phone device, an orientation of the phone device, and a motion of the phone device; and
   the comparing of the values for the set of physical attributes specified by the phone dialing pattern to the predefined values specified by the predefined phone dialing pattern comprises:
      comparing an ambient light value specified by the phone dialing pattern to a predefined ambient light value specified by the predefined phone dialing pattern,
      comparing an orientation value specified by the phone dialing pattern to a predefined orientation value specified by the predefined phone dialing pattern,
      comparing a motion value specified by the phone dialing pattern to a predefined motion value specified by the predefined phone dialing pattern, and
      comparing an object proximity value specified by the phone dialing pattern to a predefined object proximity value specified by the predefined phone dialing pattern.

7. The method of claim 6, wherein the determining of the match value for each physical attribute included in the set of physical attributes comprises:
   determining an ambient light match value based on the comparing of the ambient light value specified by the phone dialing pattern to the predefined ambient light value specified by the predefined phone dialing pattern;
   determining an orientation match value based on the comparing of the orientation value specified by the phone dialing pattern to the predefined orientation value specified by the predefined phone dialing pattern;
   determining a motion match value based on the comparing of the motion value specified by the phone dialing pattern to the predefined motion value specified by the predefined phone dialing pattern; and
   determining a proximity match value based on the comparing of the object proximity value specified by the phone dialing pattern to the predefined object proximity value specified by the predefined phone dialing pattern.

8. The method of claim 7, wherein the determining that the phone dialing pattern associated with the phone dialing event matches the predefined phone dialing pattern indicative of the unintended dialing further comprises:
   summing the ambient light match value, the orientation match value, the motion match value, and the proximity match value; and
   determining that the sum satisfies a predefined threshold.

9. The method of claim 7, wherein the determining that the phone dialing pattern associated with the phone dialing event matches the predefined phone dialing pattern indicative of the unintended dialing further comprises weighting at least one of the ambient light match value, the orientation match value, the motion match value, and the proximity match value for the summing.

10. The method of claim 1, wherein:
the phone dialing pattern specifies
   a first set of values for the set of physical attributes associated with the phone device at a time of the phone dialing event, and
   a second set of values for the set of physical attributes associated with the phone device at a time after the phone dialing event;
the predefined phone dialing pattern specifies
   a first set of predefined values for the set of physical attributes associated with the time of the phone dialing event,
   a second set of predefined values for the set of physical attributes associated with the time after the phone dialing event; and
the determining that the phone dialing pattern associated with the phone dialing event matches the predefined phone dialing pattern indicative of the unintended dialing comprises
   comparing the first set of values specified by the phone dialing pattern to the first set of predefined values specified by the predefined phone dialing pattern, and
   comparing the second set of values specified by the phone dialing pattern to the second set of predefined values specified by the predefined phone dialing pattern.

11. The method of claim 1, wherein the operation comprises one of:
locking the phone device;
canceling the placement of the phone call by the phone device; and prompting a user of the phone device to provide input to confirm that the phone dialing event is intended before executing the placement of the phone call.

12. The method of claim 1, further comprising:
maintaining, by the unintended-dialing detection and prevention system for use in detecting unintended dialing on the phone device, data representative of the unintended-dialing detection heuristic and a set of predefined phone dialing patterns, the predefined phone dialing pattern included in the set of predefined phone dialing patterns;
monitoring, by the unintended-dialing detection and prevention system over time, phone dialing behavior associated with the phone device; and
automatically tailoring, by the unintended-dialing detection and prevention system based on a configuration heuristic and the monitored phone dialing behavior associated with the phone device, at least one of the set of predefined phone dialing patterns and the unintended-dialing detection heuristic to the monitored phone dialing behavior associated with the phone device.

13. The method of claim 1, embodied as computer-executable instructions on at least one non-transitory computer-readable medium.

14. A system comprising:
a processor;
a detection facility configured to direct the processor to
   determine, based on an unintended-dialing detection heuristic, a phone dialing pattern that is associated with a phone dialing event of a phone device and that specifies values for a set of physical attributes associated with the phone device and the phone dialing event, the set of physical attributes comprising a proximity of the phone device to one or more objects that are not associated with intended dialing, and
   determine, based on the unintended-dialing detection heuristic, that the phone dialing pattern associated with the phone dialing event matches a predefined phone dialing pattern indicative of unintended dialing by comparing the values for the set of physical attributes specified by the phone dialing pattern to predefined values specified by the predefined phone dialing pattern and by determining a match value for each physical attribute included in the set of physical attributes based on the comparing, the predefined phone dialing pattern including different sets of predefined values for the set of physical attributes associated with the phone device at different time points; and
a prevention facility configured to direct the processor to execute, in response to the determination that the phone dialing pattern associated with the phone dialing event matches the predefined phone dialing pattern indicative of the unintended dialing, an operation configured to prevent a placement of a phone call by the phone device in response to the phone dialing event.

15. The system of claim 14, wherein the processor, the detection facility, and the prevention facility are implemented by the phone device.

16. The method of claim 1, wherein the determining of the phone dialing pattern includes utilizing one or more proximity sensors of the phone device to determine the proximity of the one or more objects to the phone device.

* * * * *